United States Patent [19]

Aoki et al.

[11] Patent Number: 5,049,325
[45] Date of Patent: Sep. 17, 1991

[54] METHOD FOR PRESS-MOLDING THERMOPLASTIC RESIN

[75] Inventors: Kazuo Aoki, Chiba; Tsutomu Moteki, Sodegaura; Kazuhiro Kimura, Ichihara, all of Japan

[73] Assignee: Chisso Corporation, Japan

[21] Appl. No.: 470,162

[22] Filed: Jan. 25, 1990

Related U.S. Application Data

[62] Division of Ser. No. 192,348, May 10, 1988, Pat. No. 4,925,381.

[30] Foreign Application Priority Data

May 11, 1987 [JP] Japan ................ 62-113825

[51] Int. Cl.⁵ .............................. B29C 47/92
[52] U.S. Cl. .................. 264/40.4; 264/325; 264/349; 264/40.3; 264/40.7
[58] Field of Search ............. 425/145, 146, 147, 150, 425/375, 381, 557, 558, 561, 166, 412, 449, 451.9, 376.1; 264/40.4, 319, 40.3, 40.7, 294, 349, 320, 325, 328.7, 328.11, 328.19, 328.5

[56] References Cited

U.S. PATENT DOCUMENTS

| | | | |
|---|---|---|---|
| 3,148,231 | 9/1964 | Spencer | 425/145 |
| 3,191,233 | 6/1965 | Linderoth, Jr. | 425/146 |
| 3,412,431 | 11/1968 | Lemelson | 425/145 |
| 3,677,681 | 7/1972 | Zippel et al. | 425/375 |
| 3,706,827 | 12/1972 | Nott et al. | 264/349 |
| 4,057,607 | 11/1977 | Soehnger et al. | 264/349 |
| 4,321,221 | 3/1982 | Broutman | 264/23 |
| 4,362,496 | 12/1982 | Uhlig | 425/558 |
| 4,402,901 | 9/1983 | Emura et al. | 264/294 |
| 4,478,775 | 10/1984 | Endo et al. | 264/40.3 |
| 4,571,319 | 2/1986 | Baluch et al. | 425/145 |
| 4,600,124 | 7/1986 | Price | 425/143 |
| 4,707,139 | 11/1987 | Valensky et al. | 264/40.7 |
| 4,752,201 | 6/1988 | Kauffman et al. | 425/561 |

FOREIGN PATENT DOCUMENTS

| | | | |
|---|---|---|---|
| 3416899 | 11/1985 | Fed. Rep. of Germany | 425/375 |
| 2583333 | 12/1986 | France | 425/375 |
| 57-53327 | 3/1982 | Japan | 425/381 |
| 57-66915 | 4/1982 | Japan | . |
| 59-164124 | 9/1984 | Japan | 425/145 |
| 61-181618 | 8/1986 | Japan | 425/557 |
| 62-4435 | 1/1987 | Japan | 425/145 |

*Primary Examiner*—Jeffery Thurlow
*Assistant Examiner*—Mathieu Vargot
*Attorney, Agent, or Firm*—Leydig, Voit & Mayer

[57] ABSTRACT

A process is provided in which a plasticized resin is extruded from an extruding machine into an accumulator into which the resin is stored by an amount which exceeds the amount required for one resin molding operation. The stored resin, in operation, is fed through a flexible hose to a supply and measuring device, such as a gear pump, under controlled pressure conditions. The resin is measured by the supply and measuring device by regulating the flow rate of the resin and is then charged into the mold cavity in a measured amount. The clamping of the mold can be effected by a clamping force less than that required by a conventional press-molding machine.

8 Claims, 1 Drawing Sheet

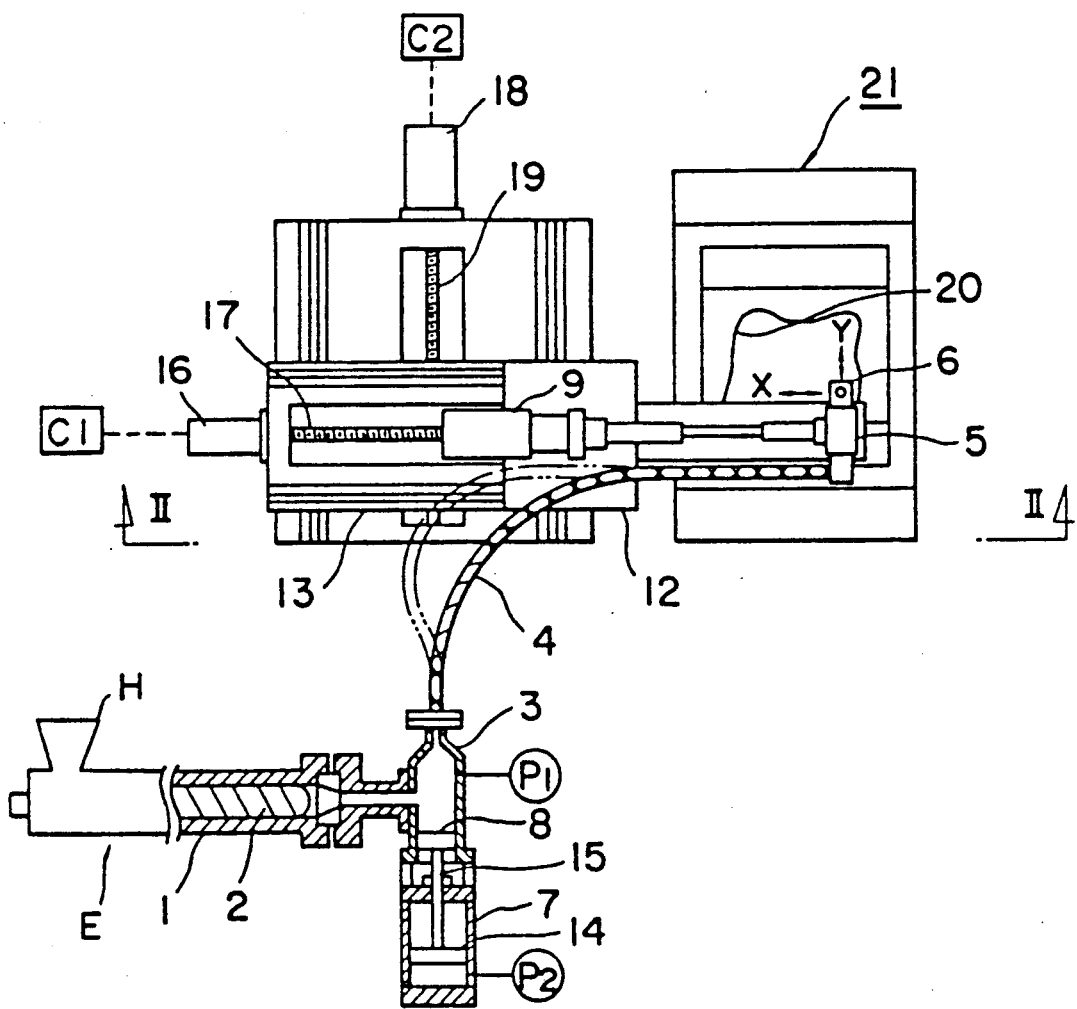
F I G. 1
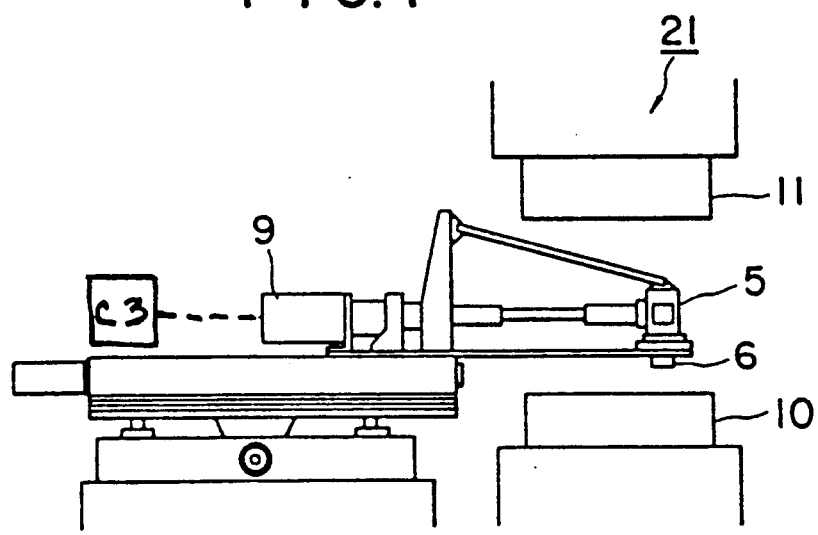
F I G. 2

METHOD FOR PRESS-MOLDING THERMOPLASTIC RESIN

This application is a divisional of application Ser. No. 192,348, filed May 10, 1988, now U.S. Pat. No. 4,925,381.

BACKGROUND OF THE INVENTION

1. Field of the Invention

This invention relates to a method for press-molding a thermoplastic resin in which a plasticized resin is charged into a lower mold half of a mold in an open state, in a press-molding machine and the lower mold half is then clamped with an upper mold half to make compression molding.

An injection molding method is generally utilized for molding a product provided with a rib, a boss or an undercut portion, or a part having a thickened portion in a wide range. With this injection molding method, however, a material to be used as a molten resin injected into a closed mold cavity through a gate portion is limited to a resin having high fluidity, which gives little potential for using a resin having high molecular weight and high viscosity which have excellent physical properties. In addition, it is also difficult to mold a specific filler containing compound resin including various long fibers or metal powders and is also difficult to obtain a mold product which is thin. Moreover, in case of molding a product having a wide molding area, one molding cycle is protracted and the clamping force for clamping the molds is inevitably increased. These defects necessitate enlargement of the molding machine provided with multiple gates, thus requiring an increased cost for the equipment. The thus molded products are frequently flawed with a sink mark, warp or weld-mark, thus producing a problem in the quality of the product. In integral molding with a cloth having raised or soft foamed material, the application of high pressure in the injection molding operation may damage the characteristics of the products.

Conventional molding methods other than the injection molding method, such as vacuum and pressure molding method or a stamping molding method of a structual material also have a limitation in the shape of a product to be molded, which results in disadvantages of low productivity or high energy consumption.

These defects or disadvantages in the conventional molding methods are result from the fact that the plasticized resin is injected into the closed mold cavity through small nozzle means and, in order to obviate these defects, there is provided a compression molding method in which the plasticized resin is injected into the mold cavity formed by mold halves which are opened and the mold halves are then clamped under pressure. As a typical example of this method, "Resin Press-Molding Method Due to Direct Auto-charge of Resin" is disclosed in the Japanese Patent Post-Examination Publication No. 43012/83, which is generally called a stamping molding system mainly utilized for molding a large scale thin resin part for an automobile. According to this conventional method, the resin, plasticized and extruded by an extruder or extruding machine, has to be automatically measured so as to obtain an amount of plasticized resin corresponding in amount to one shot of the resin. The thus obtained resin is automatically charged into a lower mold of the press-molding machine while in an open state, and the molds are then clamped thereby spreading and press-molding the resin charged in the mold cavity. During this clamping operation, the molds are cooled and, after cooling, a molded product is taken out. In this operation, the measurement of the weight of the plasticized resin and the injection of the plasticized resin are performed by using an accumulating cylinder means and, accordingly, operations for stocking the melted and plasticized resin in the resin measuring chamber of the accumulating cylinder means and injecting the stocked resin into the mold cavity of the press molding machine have to be repeated intermittently to supply the resin into the lower mold. Accordingly, in this method, it is necessary to vary the stroke of the piston in the accumulating cylinder means every time so as to accord with the weight of the resin to be charged. These operations require much time for measuring and supplying the amount of resin for one charge and, hence, one molding cycle is protracted. The protracted molding cycle causes the resin in the mold to be cooled. Moreover, relatively complicated and large scale mechanisms such as hydraulic means for operating the piston of the accumulating cylinder means are required, and the cost of equipment therefore will be increased. In addition, many other movable members such as pivotable joint members are provided between the gate of the extruding machine and the accumulating cylinder means, so that there is a fear of leakage of the resin and a problem for the maintenance thereof.

SUMMARY OF THE INVENTION

An object of this invention is to substantially eliminate the defects or drawbacks encountered in the direct auto-charge type press-molding system for a thermoplastic resin of the type described above.

Another object of this invention is to provide a method of press-molding a thermoplastic resin capable of shortening the resin charging time into a mold cavity and making use of a thermoplastic resin with high viscosity.

A further object of this invention is to provide a machine for press-molding a thermoplastic resin including a mechanism for exactly measuring a resin amount to be charged into a mold cavity under the control of a microcomputer and further including a member constituting a resin passage which is flexible with no jointed or coupled portion and is heatable by a suitable heating element so as not to lower the temperature of the resin passing therethrough.

These and other objects can be achieved according to this invention, in one aspect, by providing a method of press-molding a plasticized resin extruded from a resin extruding machine and charged into a mold cavity of a mold of a press-molding machine comprising the steps of storing an amount of plasticized resin extruded from the extruding machine which exceeds that required for one resin charging shot into a mold cavity, supplying and measuring under a constant supplying pressure and under a regulated resin flow rate condition an amount of the stored resin required for one molding operation, charging the thus measured plasticized resin into the mold cavity by the predetermined amounts, and clamping the mold for carrying out a compression molding operation.

In another aspect of this invention, there is provided a machine for press-molding a plasticized resin extruded from a resin extruding machine and charged into a mold cavity of a mold of a press-molding machine comprising an accumulator operatively connected to an outlet port of the extruding machine for accumulating the plasticized resin in an amount exceeding that required for one resin charging shot into a mold cavity, a pneumatic piston-cylinder assembly for supplying the accumulated resin from the accumulator under a constant pressure, a volumetric flow meter for measuring an amount of the supplied resin required for one molding operation under a regulated resin flow rate condition, a nozzle member connected to the volumetric flow meter for charging the measured resin into the mold cavity, a controller for controlling the displacement and operation of the volumetric flow meter and the associated nozzle member for charging predetermined amount of the measured resin into the mold cavity, and a mechanism for clamping the molds after charging the resin into the mold cavity.

According to the press-molding method and press-molding machine for the plasticized resin having the specific characteristics of this invention described above, the plasticized resin stored in the accumulator is fed through the flexible resin passage hose by the cooperation of the pressure of the pneumatic piston-cylinder assembly and the sucking force of the gear pump, so that a resin with high viscosity can be easily fed with relatively low pressure applied to the flexible hose. Since the plasticized resin exceeding that required for one molding charge is stored in the accumulator and exactly measured by the gear pump, the repeated operation for accumulating the plasticized resin into the accumulator can be eliminated, thus saving the time required for stopping the operation of the gear pump and shortening the resin charging time. In addition, the plasticized resin is extruded into the accumulator during the mold clamping operation of the press-molding machine, thus preventing a temperature change of the plasticized resin to be charged. The displacement and the revolution number or rotational speed of the gear pump can be exactly controlled by a controller such as a microcomputer, thus exactly measuring the amount of the plasticized resin to be charged into the predetermined portions of the mold cavity.

The preferred embodiments of this invention will be further described in detail hereinbelow with reference to the accompanying drawings.

BRIEF DESCRIPTION OF THE DRAWINGS

In the accompanying drawings:

FIG. 1 is a plan view, partially in section, of a machine for press-molding a plasticized resin according to this invention; and FIG. 2 is a brief side view of the machine viewed from the arrowed direction II—II shown in FIG. 1.

DESCRIPTION OF THE PREFERRED EMBODIMENTS

Referring to FIGS. 1 and 2, an extruding machine E for extruding a thermoplastic resin into a mold comprises an outer cylinder barrel 1, a hopper H through which the thermoplastic resin is fed into the cylinder barrel 1, and a screw unit 2 disposed in the barrel 1 to plasticize the thermoplastic resin and feed the same towards an extruding port formed at the front end of the extruding machine E. The extruding port is connected to an accumulator 3 for accumulating the plasticized resin from the extruding machine in an amount exceeding that required for one injection shot. A pneumatic cylinder assembly 7 is integrally connected to the rear end portion of the accumulator so that a piston member 8 slidably disposed in the accumulator 3 and a piston member 14 also slidably disposed in the pneumatic cylinder assembly 7 are operatively connected through a common piston rod 15. Air with a pressure $P_2$ regulated by a pressure adjusting means, not shown, is fed into a cylinder chamber defined in the rear portion of the pneumatic cylinder assembly 7 by the piston member 14. The piston member 14 is made of a magnetic material and the position of the piston member 14 in the cylinder assembly 7 is magnetically detected by, for example, a limit switch, not shown, located proximate to the cylinder assembly 7.

A flexible hose 4, as a resin passage, has one end connected to a front end port of the accumulator 3 and the other end connected to a gear pump 5, which is provided with a resin discharging nozzle 6 and is mounted on a table 12 movable in the X-axis direction. The gear pump 5 is operatively connected to a pulse motor 9 for driving the same, which is also mounted on the table 12. The gear pump 5 serves as a flow meter to measure and regulate the flow rate of the plasticized resin passing therethrough and, for this means, other rotary type pumps which function as a volumetric flow meter may be utilized in place of the gear pump. To the table 12 is operatively connected a nut, not shown, engaged with a screw member 17 which is driven by a pulse motor 16 so as to allow the table 12 to move in the X-axis direction along a guide located on a table 13 movable in the Y-axis direction. The tables 12 and 13 are referred to as X-axis and Y-axis tables 12 and 13, respectively, hereinafter for convenience sake. The Y-axis table 13 is movable in the Y-axis direction by a nut, not shown, engaged with a screw member 19 which is driven by a pulse motor 18. The operations of the pulse motors 9, 16, and 18 are controlled by microcomputer means, respectively, which are per se of a known type and briefly illustrated as $C_1$, $C_2$ and $C_3$.

The positions of the X-axis and Y-axis tables 12 and 13 are detected by position detectors and signals representing the positions thereof are transmitted from the detectors into a controller, not shown. The X-axis and Y-axis directional positions of the gear pump 5 are determined in accordance with these position signals and the revolution numbers of the pulse motors 16 and 18 and memorized in the controller. The gear pump 5 can thus be movable in the X- and Y-axes directions.

A press-molding machine 21 is located in an area wherein the gear pump 5 is freely movable. The press-molding machine 21 is provided with upper and lower mold halves 11 and 10 which are opened in a state shown in FIG. 2, in which the gear pump 5 is positioned between the upper and lower mold halves 11 and 10. When the gear pump 5 is retracted from this position, the upper mold half 11 is lowered by the action of a hydraulic means to forcibly contact or engage the lower mold half 10. As described before, the resin passage 4 connecting the accumulator 3 and the gear pump 5 is made of a flexible, heat-resisting and pressure-proof material, so that the movement of the gear pump 5 is freely performed. A preferred flexible hose 4 is made of a fluorine resin such as tetra-fluoroethylene polymer containing a metal wire and is reinforced by a reinforcing wire as a whole. A heating wire is further wound in spiral around the outer surface of the flexible tube 4 in a preferred embodiment of this invention for keeping constant the temperature of the plasticized resin passing therethrough.

The extruding and press-molding machines having constructions described hereinabove operate in the manner described hereunder.

The extruding machine E is first driven to extrude the plasticized resin into the accumulator 3 under the operation of the gear pump 5 being stopped. The piston member 14 is retracted and, when the predetermined amount of the plasticized resin corresponding to the amount exceeding that for one injection shot is stored in the accumulator 3, the limit switch detects the position of the piston member 14 and generates a signal to stop the operation of the extruding machine E. In this state, the gear pump 5 is moved to a predetermined position above the lower mold half 10 of the press-molding machine 21 being in an opened condition. Upon detecting the signal representing the fact that the predetermined amount of the plasticized resin is stored in the accumulator 3, the pulse motor 9 is driven to rotate the gear pump 5 to thereby measure the plasticized resin to be charged and charge the plasticized resin from the accumulator 3 through the hose 4 and through the nozzle 6 into the cavity 20 of the lower mold half 10. When the plasticized resin in the accumulator 3 is transferred by the operation of the gear pump 5, the piston member 8 advances by the pneumatic pressure $P_2$ (kg/cm$^2$) in the cylinder chamber of the cylinder assembly 7 and stops when the resin pressure $P_1$ (kg/cm$^2$) in the accumulator 3 and the pressure $P_2$ are balanced, whereby pressure on the suction side of the gear pump 5 is maintained constant. Accordingly, the flow amount of the plasticized resin to be charged by the gear pump 5 into the recess of the lower mold half 10 can be exactly controlled by the revolution number or rotational speed and the driving time of the pulse motor 9.

During the rotation of the gear pump 5, the pulse motors 16 and 18 are driven to move the gear pump 5 in the X- and Y-axes directions through the movements of the X-axis and Y-axis tables 12 and 13 to properly charge the plasticized resin in the cavity 20 of the lower mold half 10 in accordance with the moving locus of the gear pump 5. The resin charging mode can be optionally selected by controlling the rotational speed and the driving time of the pulse motors 16 and 18 so that, for example, much resin is charged for the formation of a thickened portion such as a boss or rib and less resin is charged for the formation of a thin portion. In actual operation, however, it is desirable to charge the plasticized resin to provide a thickness more than 5 mm for ensuring the temperature retaining characteristic of the resin. The moving speed of the gear pump 5 is based on the area to be molded, but is usually controlled in the range 5~200 mm/sec.

After charging of the plasticized resin into the cavity 20 of the lower mold half 10 has been completed, the operation of the gear pump 5 is stopped and the gear pump 5 is then retracted to a position spaced from the mold clamping motion area of the press-molding machine 21. Upon the gear pump 5 being retracted, the upper mold half 11 is immediately lowered to forcibly press the stationary lower die to carry out the mold clamping operation. The plasticized resin charged into the mold cavity is distributed by the mold clamping force so as to fill the resin in the predetermined shape. After clamping and then cooling the mold, the upper mold half 11 is lifted upwardly to take out a molded product. The molding pressure imparted by the mold clamping force differs in various applications due to the viscosity or fluidability of the plasticized resin used and the shapes of projecting portions and corner portions of a product to be molded, but usually pressure of about 30 to 100 kg/cm$^2$ is available, which is less than one-third of the molding pressure required in the conventional injection molding method.

A time for filling the plasticized resin into the accumulator 3 can be set to a time required for the press-molding cycle, i.e., the waiting time of the gear pump 5 for the next charge of the plasticized resin in the lower mold half 10. In case these times are compared on the basis of the ratio of the operating capacities, according to an embodiment of this invention, an extruding machine having a resin extruding capacity ranging between one-sixth to one-third of the resin discharging capacity of a gear pump can be selectively used. For example, in case the plasticized resin in an amount of 500 g for one injection shot is charged into the mold for 5 seconds and the press-molding time is set to 30 seconds, the capacity for discharging a resin amount of 100 g/sec (360 kg/hr) is required for the gear pump 5, whereas an extruding machine having merely the extruding capacity of 16.7 g/sec (60 kg/hr) can be utilized. Accordingly, the extruding machine in this case can achieve the material balance in the plasticized resin feeding and charging operations with the treating capacity one-sixth of that of the gear pump 5, thus being advantageous in the installation of the equipment.

According to the method of this invention, a product was obtained in the following manner.

As a thermoplastic resin, a compound resin of polypropylene (melting point: 165° C., melt flow rate (230° C.): 6 g/10 min., density: 0.97 g/cm$^3$) was used to which talc of 10 weight % was added to obtain a product having an average thickness of 1.8 mm and a product weight of 195 g (molded area of about 1,000 cm$^2$). The molding operation was performed under resin charging temperature: 190° C.±3° C., temperature of mold: 30° C., mold clamping force: 70 ton (i.e., molding pressure: 70 kg/cm$^2$) and clamped mold holding time: 20 seconds. After 20 seconds, when the upper mold half was lifted, the temperature of the product was cooled to a temperature less than 50° C. and the product did not exhibit any change on standing. The resin charging time of this molding cycle was 3 seconds (charging amount of gear pump: 65 g/sec), and a total molding cycle was achieved in 28 seconds in consideration of another additional operation time. The thermoplastic resin utilized for this invention is not limited to that of the type described hereinbefore, and many other materials can be utilized such as crystalline polyolefin resin such as polypropylene, polyethylene, and ethylene-propylene copolymer, or polystyrene, polyamide, and ABS resin or compounds thereof. Furthermore, resin including talc, mica, glass fiber, synthetic resin or wood powder in addition to one of the resins described above may be utilized as a thermoplastic resin to be utilized for this invention. In a preferred embodiment, a hydraulically operative molding press is used as a molding press or press-molding machine.

According to this invention, as described hereinbefore, the thermoplastic resin press-molding method is of the direct-charge type in which the plasticized resin is directly charged into the mold cavity of the mold halves in an open state, so that the press-molding operation for obtaining a product having large size and relatively thin thickness can be performed at a molding speed remarkably higher than that in an injection molding method or vacuum forming method. Approximately 100% yield of the material can achieve an extremely high productivity, thus obtaining molded products with reduced cost in comparison with the conventional molding methods. In addition, various types of resins can be utilized, and, accordingly, an integral molding with other material such as surface decoration material made of such substances as polyvinyl chloride (PVC) leather or woven cloth with raising for the interior trim parts material for an automobile, for example, can be made.

Moreover, even in comparison with the conventional direct charge type molding method, according to this invention, the plasticized resin can be charged into the mold cavity through the accumulator and the flexible tube by the operation of the gear pump under the regulated flow rate of the resin, even with the high viscosity, to be charged for the resin charging time. A plasticized resin having a relatively low temperature can be utilized, and the cooling time for the charged resin can thus be shortened. The resin also can be charged into the mold cavity exactly in conformity with the shape of the mold, so that the resin is charged in a simple flow mode without substantially exhibiting the complicated orientation and the inner distortion of a product. This advantage can be improved by the fact that the mold clamping operation is done with relatively low molding pressure. The product molded in the manner thus described has a physical property substantially equally orientated in the vertical and lateral directions of the product and also has an excellent extension strength, impact-proof strength and stability in dimensions with no shrinkage and warp. The location of the flexible tube for passing the plasticized resin without using any coupling means can prevent the resin from leaking from coupled or jointed portions.

What is claimed is:

1. A method of press-molding a plasticized resin extruded from a resin extruding machine and charged into a mold cavity of a mold of a press-molding machine comprising the steps of:

storing an amount of plasticized resin extruded from the extruding machine which exceeds that required for one molding operation;

supplying a stored resin under a constant supply pressure;

measuring an amount of the stored resin required for one molding operation by controlling the rotational speed of a rotary volumetric flow meter means to thereby regulate the resin flow rate;

charging the thus measured amount of plasticized resin into the mold cavity; and clamping the mold to effect a press-molding operation.

2. The press-molding method according to claim 1 wherein the plasticized resin is stored in an accumulator.

3. The press-molding method according to claim 1 wherein the plasticized resin is supplied by a pneumatic piston-cylinder assembly.

4. The press-molding method according to claim 1 wherein the rotary volumetric flow meter means comprises a gear pump.

5. The press-molding method according to claim 1 wherein a controller is employed to control the displacement and operation of said volumetric flow meter means.

6. The press-molding method according to claim 2 wherein the plasticized resin is supplied from said accumulator by a pneumatic piston-cylinder assembly located in said accumulator in combination with a gear pump.

7. The press-molding method according to claim 2 wherein plasticized resin is extruded into said accumulator while the mold is being clamped.

8. The press-molding method according to claim 4 wherein said gear pump is controlled by a microcomputer.

* * * * *